United States Patent
Baker-Ostiguy et al.

(10) Patent No.: US 12,510,082 B1
(45) Date of Patent: Dec. 30, 2025

(54) IMPELLER ROTOR SEAL RUNNER WITH DIVERGENT GUIDE SURFACE

(71) Applicant: Pratt & Whitney Canada Corp., Longueuil (CA)

(72) Inventors: Simon Baker-Ostiguy, Montreal (CA); Michel Labbe, Montreal (CA); Stephane Gignac, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/934,766

(22) Filed: Nov. 1, 2024

(51) Int. Cl.
| | |
|---|---|
| *F04D 9/00* | (2006.01) |
| *B01D 19/00* | (2006.01) |
| *F01D 11/00* | (2006.01) |
| *F02C 7/32* | (2006.01) |
| *F04D 29/08* | (2006.01) |
| *F04D 29/12* | (2006.01) |
| *F04D 29/20* | (2006.01) |
| *F04D 31/00* | (2006.01) |
| *F16J 15/3212* | (2016.01) |

(52) U.S. Cl.
CPC ......... *F04D 9/003* (2013.01); *B01D 19/0052* (2013.01); *F01D 11/006* (2013.01); *F02C 7/32* (2013.01); *F04D 29/086* (2013.01); *F04D 29/12* (2013.01); *F04D 29/20* (2013.01); *F04D 31/00* (2013.01); *F16J 15/3212* (2013.01); *F05D 2240/55* (2013.01); *F05D 2240/61* (2013.01); *F05D 2260/609* (2013.01)

(58) Field of Classification Search
CPC ........ F04D 9/003; F04D 29/086; F04D 29/12; F04D 29/20; F04D 31/00; F01D 11/006; F02C 7/32; F16J 15/3212; B01D 19/0052; F05D 2240/55; F05D 2240/61; F05D 2260/609
See application file for complete search history.

(56) References Cited

U.S. PATENT DOCUMENTS

| | | | | |
|---|---|---|---|---|
| 2,296,701 A | * | 9/1942 | Frederic | F01D 25/18 417/373 |
| 3,601,417 A | * | 8/1971 | Szepesvary | F16J 15/3208 277/572 |

(Continued)

FOREIGN PATENT DOCUMENTS

| | | |
|---|---|---|
| FR | 3090035 B1 | 2/2021 |
| GB | 2532197 B | 5/2019 |

*Primary Examiner* — Brian Christopher Delrue
(74) *Attorney, Agent, or Firm* — Getz Balich LLC (57) ABSTRACT

An apparatus for an aircraft powerplant includes an impeller rotor and a seal runner. The impeller rotor includes a plurality of fluid circuits. Each of the fluid circuits includes a first outlet passage, a second outlet passage and an inlet passage fluidly coupled to the first outlet passage and the second outlet passage in parallel. The seal runner includes a bore, an inner guide surface and an outer land surface. The seal runner extends circumferentially about the axis and radially between the inner guide surface and the outer land surface. The bore is fluidly coupled to the first outlet passage of each fluid circuit. The inner guide surface forms a radial outer peripheral boundary of the bore. The inner guide surface radially diverges away from the axis as the inner guide surface extends axially away from the impeller rotor and to a distal end of the seal runner.

19 Claims, 4 Drawing Sheets

(56) References Cited

U.S. PATENT DOCUMENTS

| | | | | |
|---|---|---|---|---|
| 3,921,992 | A * | 11/1975 | Bertin | F16J 15/3208 |
| | | | | 277/560 |
| 4,217,120 | A * | 8/1980 | Reynolds | B64D 33/00 |
| | | | | 55/409 |
| 4,569,638 | A * | 2/1986 | Harker | F04D 29/126 |
| | | | | 403/372 |
| 4,798,320 | A | 1/1989 | Fang | |
| 7,055,827 | B2 | 6/2006 | Langston | |
| 7,252,474 | B2 * | 8/2007 | Belokon | F04D 29/124 |
| | | | | 415/173.5 |
| 7,334,982 | B2 * | 2/2008 | Singh | F01D 25/183 |
| | | | | 415/230 |
| 7,377,110 | B2 * | 5/2008 | Sheridan | F01D 11/04 |
| | | | | 60/39.08 |
| 7,909,578 | B2 | 3/2011 | Nishiyama | |
| 8,985,277 | B2 | 3/2015 | Hetherington | |
| 10,233,937 | B1 * | 3/2019 | Volk | F04D 29/426 |
| 11,549,443 | B2 * | 1/2023 | Baker-Ostiguy | F02C 7/32 |
| 2007/0292268 | A1 * | 12/2007 | Nishiyama | F04D 29/266 |
| | | | | 415/230 |
| 2008/0104837 | A1 * | 5/2008 | Ikeda | F04D 29/2227 |
| | | | | 29/889 |
| 2010/0008768 | A1 * | 1/2010 | Vedsted | F04D 7/04 |
| | | | | 415/173.1 |
| 2013/0319240 | A1 * | 12/2013 | Short | F01D 25/183 |
| | | | | 95/268 |
| 2015/0176492 | A1 * | 6/2015 | Cutrara | F01M 1/00 |
| | | | | 184/106 |
| 2016/0097293 | A1 * | 4/2016 | Svihla | F16J 15/40 |
| | | | | 277/424 |
| 2016/0138444 | A1 * | 5/2016 | Prunera-Usach | B01D 45/14 |
| | | | | 74/431 |
| 2017/0234398 | A1 * | 8/2017 | Kamiya | F16F 15/126 |
| | | | | 277/562 |
| 2019/0338705 | A1 * | 11/2019 | Reid | F16N 39/002 |
| 2021/0254628 | A1 * | 8/2021 | Stoyanov | F16J 15/30 |
| 2023/0044553 | A1 * | 2/2023 | Baker-Ostiguy | F04D 9/003 |

* cited by examiner

IMPELLER ROTOR SEAL RUNNER WITH DIVERGENT GUIDE SURFACE

TECHNICAL FIELD

This disclosure relates generally to an aircraft powerplant and, more particularly, to an impeller rotor for the aircraft powerplant.

BACKGROUND INFORMATION

An aircraft powerplant such as a gas turbine engine may include a deaerator for separating a fluid into its liquid and gas components. Various types and configurations of deaerators are known in the art. While these known deaerators have various benefits, there is still room in the art for improvement.

SUMMARY

According to an aspect of the present disclosure, an apparatus is provided for an aircraft powerplant. This apparatus includes an impeller rotor and a seal runner. The impeller rotor is configured to rotate about an axis. The impeller rotor includes a plurality of fluid circuits arranged circumferentially about the axis within the impeller rotor. Each of the fluid circuits includes a first outlet passage, a second outlet passage and an inlet passage fluidly coupled to the first outlet passage and the second outlet passage in parallel. The seal runner is connected to and rotatable with the impeller rotor. The seal runner includes a bore, an inner guide surface and an outer land surface. The seal runner extends circumferentially about the axis and radially between the inner guide surface and the outer land surface. The bore is fluidly coupled to the first outlet passage of each of the fluid circuits. The inner guide surface forms a radial outer peripheral boundary of the bore. The inner guide surface radially diverges away from the axis as the inner guide surface extends axially away from the impeller rotor and to a distal end of the seal runner.

According to another aspect of the present disclosure, another apparatus is provided for an aircraft powerplant. This apparatus includes an impeller rotor and a seal runner. The impeller rotor is configured to rotate about an axis. The impeller rotor includes a plurality of fluid circuits arranged circumferentially about the axis within the impeller rotor. Each of the fluid circuits includes a first outlet passage, a second outlet passage and an inlet passage fluidly coupled to the first outlet passage and the second outlet passage in parallel. The seal runner projects axially out from the impeller rotor to a distal end of the seal runner. The seal runner includes a bore, a plurality of ports, an inner guide surface and an outer land surface. The seal runner extends circumferentially about the axis and radially between the inner guide surface and the outer land surface. Each of the ports fluidly couples the first outlet passage of at least one of the fluid circuits to the bore. The inner guide surface forms a radial outer peripheral boundary of the bore. The inner guide surface radially diverges away from the axis as the inner guide surface extends axially away from the impeller rotor. The inner guide surface is angularly offset from the axis by an angle less than fifteen degrees.

According to still another aspect of the present disclosure, another apparatus is provided for an aircraft powerplant. This apparatus includes an impeller rotor, a seal runner and a lip seal. The impeller rotor is configured to rotate about an axis. The impeller rotor includes a plurality of fluid circuits arranged circumferentially about the axis within the impeller rotor. Each of the fluid circuits includes a first outlet passage, a second outlet passage and an inlet passage fluidly coupled to the first outlet passage and the second outlet passage in parallel. The seal runner projects axially out from the impeller rotor to a distal end of the seal runner. The seal runner includes a bore, a plurality of ports, an inner guide surface and an outer land surface. The seal runner extends circumferentially about the axis and radially between the inner guide surface and the outer land surface. Each of the ports fluidly couples the first outlet passage of at least one of the fluid circuits to the bore. The inner guide surface forms a radial outer peripheral boundary of the bore. The inner guide surface radially diverges away from the axis as the inner guide surface extends axially away from the impeller rotor. The lip seal circumscribes and radially sealingly engages the outer land surface. The lip seal axially overlaps the inner guide surface.

The inner guide surface may extend axially to the distal end of the seal runner.

The seal runner may also include an inner base surface parallel with the axis. The inner base surface may also form another radial outer peripheral boundary of the bore. Each of the ports pierces the inner base surface.

The seal runner may also include an inner base surface axially adjacent the inner guide surface. The inner base surface may also form another radial outer peripheral boundary of the bore. Each of the ports may pierce the inner base surface. An axial length of the inner guide surface may be equal to or greater than an axial length of the inner base surface.

The inner guide surface may be a frustoconical surface.

A slope of the inner guide surface may have a radial rise and an axial run where the axial run is greater than the radial rise.

The inner guide surface may be angularly offset from the axis by an angle less than fifteen degrees.

An axial length of the inner guide surface may be equal to or greater than one-third of an axial length of the seal runner.

The seal runner may include a sidewall and an endwall. The sidewall may project axially out from the endwall to the distal end of the seal runner. The sidewall may include the inner guide surface, the outer land surface and a plurality of ports. Each of the ports may extend radially through the sidewall. Each of the ports may fluidly couple the first outlet passage of at least one of the fluid circuits to the bore. The bore may extend axially along the sidewall to the endwall.

The sidewall may also include an inner base surface angularly offset from the inner guide surface. Each of the ports may pierce the inner base surface.

The inner base surface may be a cylindrical surface.

The seal runner may also include a rim projecting radially out from the sidewall to an outer end of the rim. The rim may be seated in a recess in the impeller rotor. The rim may include a flat disposed at the outer end of the rim and configured to engage a flat of the impeller rotor.

The outer end of the rim may have a polygonal cross-sectional geometry in a reference plane perpendicular to the axis.

The recess may have a polygonal cross-sectional geometry in a reference plane perpendicular to the axis.

The seal runner may be mechanically attached to the impeller rotor.

The apparatus may also include a lip seal circumscribing and radially sealingly engaging the outer land surface.

The impeller rotor may include a vane structure and a shroud circumscribing the vane structure. The vane structure may include a first sidewall, a second sidewall and a plurality of vanes arranged circumferentially about the axis. Each of the vanes may include an inlet vane portion, a first outlet vane portion and a second outlet vane portion. The inlet vane portion may be radially between the second sidewall and the shroud. The inlet vane portion may form a side of the inlet passage of a respective one of the fluid circuits. The first outlet vane portion may be axially between the first sidewall and the second sidewall. The first outlet vane portion may form a side of the first outlet passage of a respective one of the fluid circuits. The second outlet vane portion may be radially between the first sidewall and the shroud. The second outlet vane portion may form a side of the second outlet passage of a respective one of the fluid circuits.

The impeller rotor may be configured as or otherwise include a deaerator impeller rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
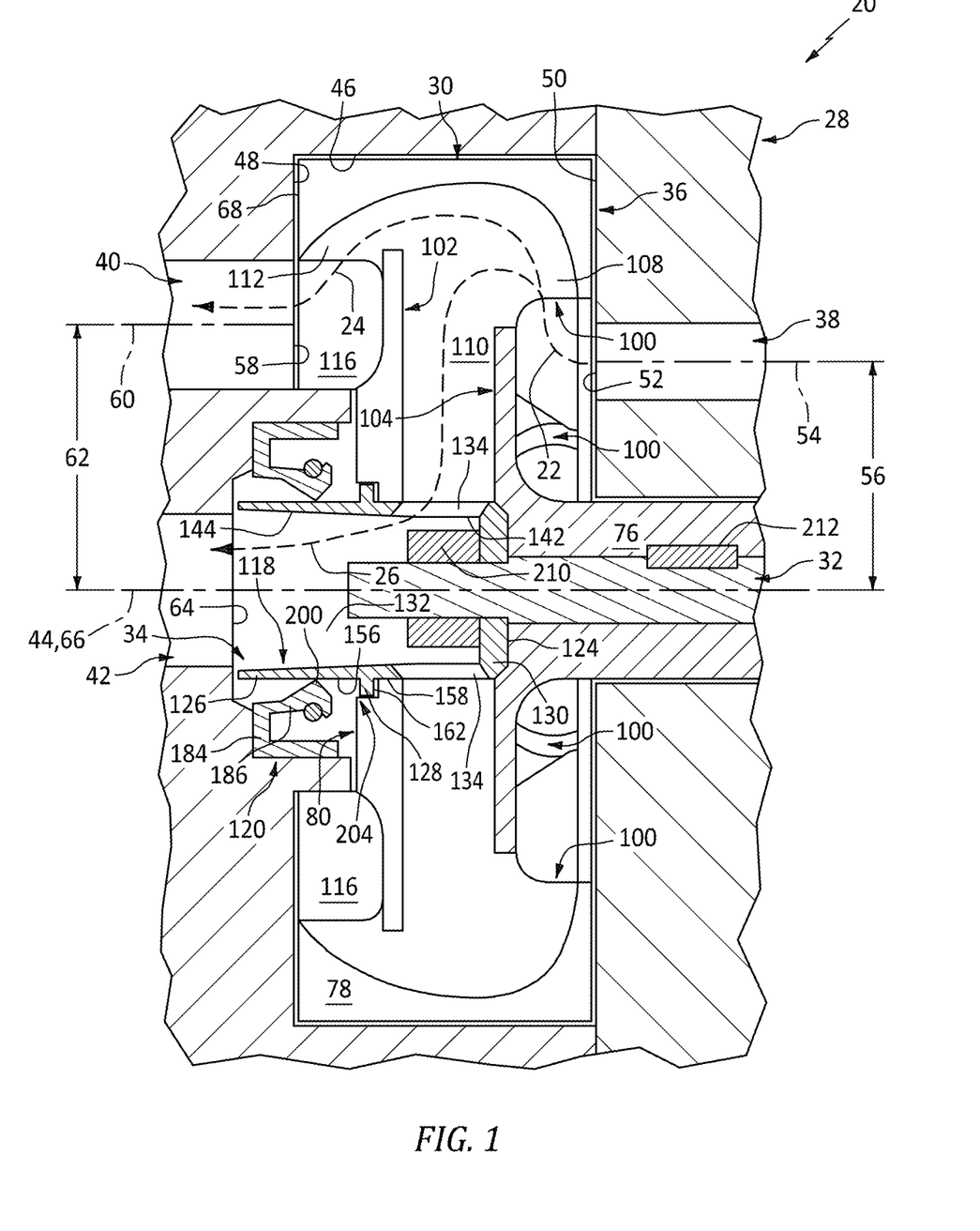
FIG. 1 is a side sectional illustration of a portion of a deaerator for an aircraft powerplant.

FIG. 1 illustrates a deaerator 20 for a powerplant of an aircraft. Briefly, the aircraft may be an airplane, a rotorcraft (e.g., a helicopter), a drone (e.g., an unmanned aerial vehicle (UAV)) or any other manned or unmanned aerial vehicle or system. The aircraft powerplant may be configured as, or otherwise included as part of, a propulsion system for the aircraft. The powerplant may also or alternatively be configured as, or otherwise included as part of, an electrical power system for the aircraft. The aircraft powerplant may be or otherwise include a thermal engine; e.g., a gas turbine engine, a rotary engine (e.g., a Wankel engine), a reciprocating piston engine, etc. The aircraft powerplant may alternatively be or also include one or more electric machines; e.g., electric motor(s), electric motor-generator(s), etc.

The powerplant deaerator 20 is configured to separate a fluid flow 22 with a liquid component and a gas component substantially into a separate liquid component flow 24 and a separate gas component flow 26. The powerplant deaerator 20 may therefore also be referred to as a liquid-gas separator. More particularly, where the liquid component is or otherwise includes lubricant (e.g., oil) and where the gas component is or otherwise includes air, the powerplant deaerator 20 may be referred to as a lubricant-air separator or a de-oiler. The powerplant deaerator 20 of FIG. 1 includes a static structure 28, a deaerator impeller rotor 30, a shaft 32 and a seal assembly 34.

The static structure 28 may be configured as a dedicated housing for the deaerator components 30, 32 and 34; e.g., a deaerator case. The static structure 28 may alternatively be configured to support and/or house one or more other components of the aircraft powerplant in addition to housing the deaerator components 30, 32 and 34. The static structure 28 of FIG. 1 includes an impeller rotor cavity 36, a fluid inlet passage 38, a liquid outlet passage 40 and a gas outlet passage 42.

The rotor cavity 36 extends radially out from a rotational axis 44 (e.g., a centerline axis) of the powerplant deaerator 20 within the static structure 28 to a radial outer side 46 of the rotor cavity 36. The rotor cavity 36 extends (e.g., completely) circumferentially around the rotational axis 44 within the static structure 28. The rotor cavity 36 extends axially along the rotational axis 44 within the static structure 28 between and to an axial first side 48 (e.g., downstream side) of the rotor cavity 36 and an axial second side 50 (e.g., upstream side) of the rotor cavity 36.

The fluid inlet passage 38 extends axially along the rotational axis 44 within and/or into the static structure 28 to the rotor cavity 36. An outlet 52 from the fluid inlet passage 38 is fluidly coupled with the rotor cavity 36. The fluid inlet passage 38 is located to the rotor cavity second side 50. A centerline 54 of the fluid inlet passage 38 of FIG. 1 (e.g., at the fluid inlet passage outlet 52) is radially offset from the rotational axis 44 by a radial distance 56. While the fluid inlet passage centerline 54 is shown in FIG. 1 as parallel with the rotational axis 44, the present disclosure is not limited to such an exemplary arrangement. For example, the fluid inlet passage centerline 54 and, thus, the fluid inlet passage 38 may alternatively be angularly offset from the rotational axis 44 and/or angularly offset from the rotor cavity second side 50 by an acute angle or an obtuse angle.

The liquid outlet passage 40 extends axially along the rotational axis 44 within and/or into the static structure 28 to the rotor cavity 36. An inlet 58 into the liquid outlet passage 40 is fluidly coupled with the rotor cavity 36. The liquid outlet passage 40 is located to the rotor cavity first side 48. A centerline 60 of the liquid outlet passage 40 of FIG. 1 (e.g., at the liquid outlet passage inlet 58) is radially offset from the rotational axis 44 by a radial distance 62. This liquid outlet passage distance 62 may be greater than the inlet passage distance 56. While the liquid outlet passage centerline 60 is shown in FIG. 1 as parallel with the rotational axis 44, the present disclosure is not limited to such an exemplary arrangement. For example, the liquid outlet passage centerline 60 and, thus, the liquid outlet passage 40 may alternatively be angularly offset from the rotational axis 44 and/or angularly offset from the rotor cavity first side 48 by an acute angle or an obtuse angle.

The gas outlet passage 42 extends axially along the rotational axis 44 within and/or into the static structure 28 to the rotor cavity 36. An inlet 64 into the gas outlet passage 42 is fluidly coupled with the rotor cavity 36. The gas outlet passage 42 is located to the rotor cavity first side 48. A centerline 66 of the gas outlet passage 42 of FIG. 1 may be aligned (e.g., coaxial) with the rotational axis 44. With this arrangement, the gas outlet passage 42 is positioned radially inward of the liquid outlet passage 40, and the fluid inlet passage centerline 54 is generally aligned radially between the liquid outlet passage centerline 60 and the gas outlet passage centerline 66.

Figure 2:
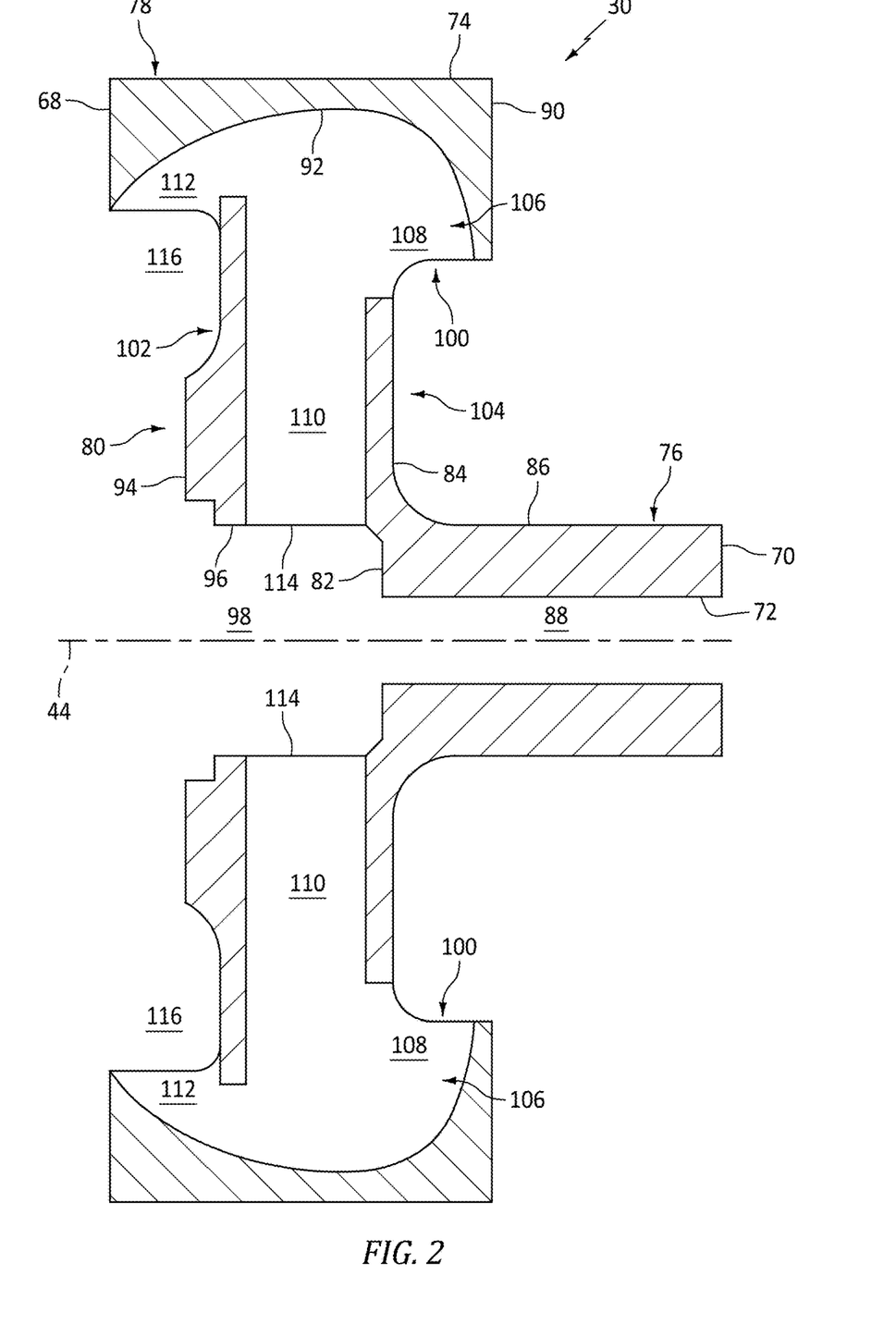
FIG. 2 is a side sectional illustration of an impeller rotor.

Referring to FIG. 2, the impeller rotor 30 is configured to rotate about the rotational axis 44. The impeller rotor 30 extends axially along the rotational axis 44 between and to an axial first side 68 (e.g., a downstream side) of the impeller rotor 30 and an axial second side 70 (e.g., upstream side) of the impeller rotor 30. The impeller rotor 30 extends (e.g., completely) circumferentially around the rotational axis 44 providing the impeller rotor 30 with a full-hoop body. The impeller rotor 30 extends radially from a radial inner side 72 of the impeller rotor 30 to a radial outer side 74 of the impeller rotor 30. The impeller rotor 30 of FIG. 2 includes an inner impeller rotor hub 76, an outer impeller rotor shroud 78 and a vane array structure 80.

The rotor hub 76 extends axially along the rotational axis 44 between and to the rotor second side 70 and an axial first side 82 of the rotor hub 76. The hub first side 82 of FIG. 2 is axially offset (e.g., recessed) from the rotor first side 68. The hub first side 82 of FIG. 2, for example, is located axially at (e.g., on, adjacent or proximate) an axial second side 84 of the vane array structure 80. The rotor hub 76 extends (e.g., completely) circumferentially around the rotational axis 44 providing the rotor hub 76 with a tubular body. The rotor hub 76 extends radially between and to the rotor inner side 72 and a radial outer side 86 of the rotor hub 76. The rotor hub 76 forms a hub bore 88 within the impeller rotor 30. This hub bore 88 projects axially along the rotational axis 44 into the impeller rotor 30 from the rotor second side 70.

The rotor shroud 78 extends axially along the rotational axis 44 between and to the rotor first side 68 and an axial second side 90 of the rotor shroud 78. The shroud second side 90 of FIG. 2 is axially offset (e.g., recessed) from the rotor second side 70. A portion of the rotor shroud 78 at the shroud second side 90 may axially overlap a portion of the rotor hub 76 at the hub first side 82. The rotor shroud 78 extends (e.g., completely) circumferentially around the rotational axis 44 providing the rotor shroud 78 with a tubular body. The rotor shroud 78 extends radially between and to a radial inner side 92 of the rotor shroud 78 to the rotor outer side 74.

The vane array structure 80 extends axially along the rotational axis 44 between and to an axial first side 94 (e.g., a downstream side) of the vane array structure 80 and the second side 84 of the vane array structure 80. The vane array structure 80 extends (e.g., completely) circumferentially around the rotational axis 44 providing the vane array structure 80 with a full-hoop body. The vane array structure 80 is arranged radially between and is connected to (e.g., formed integral with or otherwise attached to) the rotor hub 76 and the rotor shroud 78. A radial inner side 96 of the vane array structure 80 forms a structure bore 98 (or a counterbore to the hub bore 88) within the impeller rotor 30. This structure bore 98 projects axially along the rotational axis 44 into the impeller rotor 30 from the first side 94 of the vane array structure 80 to, for example, the hub bore 88.

The vane array structure 80 of FIG. 2 includes a plurality of impeller rotor vanes 100, an axial first structure sidewall 102 (e.g., a downstream sidewall) and an axial second structure sidewall 104 (e.g., an upstream sidewall). The rotor vanes 100 are arranged circumferentially about the rotational axis 44 in an array. This annular array of the rotor vanes 100 is located radially between the rotor hub 76 and the rotor shroud 78, and axially adjacent and/or radially along the structure sidewalls 102 and 104. Each of the rotor vanes 100 of FIG. 2, for example, extends radially between and to the rotor hub 76 and the rotor shroud 78. An inner portion (e.g., a gas passage portion) of each of the rotor vanes 100 extends axially along the rotational axis 44 between and to the first structure sidewall 102 and the second structure sidewall 104. The first structure sidewall 102 is disposed towards the first side 94 of the vane array structure 80. The second structure sidewall 104 is disposed towards the second side 84 of the vane array structure 80.

The impeller rotor 30 of FIG. 2 includes a plurality of internal fluid circuits 106 within the impeller rotor 30. These fluid circuits 106 are arranged circumferentially about the rotational axis 44 in an array; e.g., a circular array. Each of the fluid circuits 106 includes an inlet passage 108, a gas outlet passage 110 and a liquid outlet passage 112.

The inlet passage 108 is located towards the second side 84 of the vane array structure 80. The inlet passage 108 of each fluid circuit 106 is disposed circumferentially between a respective circumferentially neighboring (e.g., adjacent) pair of the rotor vanes 100. The inlet passage 108 is thereby formed by an inlet vane portion of each neighboring rotor vane 100. The inlet passage 108 of FIG. 2 projects axially along the rotational axis 44 into the impeller rotor 30 and its vane array structure 80 from the second side 84 of the vane array structure 80 to (or about) the second structure sidewall 104. The inlet passage 108 is fluidly coupled to the gas outlet passage 110 and the liquid outlet passage 112 in parallel.

The gas outlet passage 110 of each fluid circuit 106 is disposed circumferentially between a respective circumferentially neighboring (e.g., adjacent) pair of the rotor vanes 100. The gas outlet passage 110 is thereby formed by a gas outlet vane portion of each neighboring rotor vane 100. The gas outlet passage 110 of FIG. 2 follows a (e.g., curved) trajectory within the vane array structure 80 (axially between and radially along the structure sidewalls 102 and 104) to a respective outlet 114 at the inner side 96 of the vane array structure 80. The trajectory of the gas outlet passage 110 of FIG. 2 turns around a radial outer tip of the second structure sidewall 104. Each gas outlet passage 110 fluidly couples the inlet passage 108 to the structure bore 98.

The liquid outlet passage 112 of each fluid circuit 106 is disposed circumferentially between a respective circumferentially neighboring (e.g., adjacent) pair of the rotor vanes 100. The liquid outlet passage 112 is thereby formed by a liquid outlet vane portion of each neighboring rotor vane 100. The liquid outlet passage 112 follows a (e.g., curved) trajectory within the vane array structure 80 to an outlet 116 (e.g., an annular outlet passage) at the first side 94 of the vane array structure 80. The trajectory of the liquid outlet passage 112 of FIG. 2 turns around a radial outer tip of the first structure sidewall 102. Each liquid outlet passage 112 fluidly couples the respective inlet passage 108 to the outlet 116.

With the foregoing arrangement, each set of passages 108, 110 and 112 provides the respective fluid circuit 106 with a forked configuration within the impeller rotor 30. An inner leg of this forked fluid circuit 106 extends to the structure bore 98. An outer leg of the forked fluid circuit 106 extends to the outlet 116.

The impeller rotor 30 of FIG. 2 and its components 76, 78 and 80 are configured together as a monolithic body. The impeller rotor 30, for example, may be cast, machined, additive manufactured and/or otherwise formed as a single, unitary body. By contrast, a non-unitary body is formed from a plurality of discretely formed parts which are assembled together after formation. The impeller rotor 30 is constructed from or otherwise includes impeller rotor material. This impeller rotor material may be a relatively light-weight metal such as, but not limited to, aluminum (Al) or aluminum alloy. The present disclosure, however, is not limited to the foregoing exemplary impeller rotor materials, nor to monolithic impeller rotor configurations.

Referring to FIG. 1, the shaft 32 extends axially along and is rotatable about the rotational axis 44. The shaft 32 is constructed from or otherwise includes shaft material. This shaft material may be the same as or different than the impeller rotor material. The shaft material, for example, may be a relatively light-weight metal such as, but not limited to, aluminum (Al) or aluminum alloy. Alternatively, the shaft material may be a denser and/or harder metal such as, but not limited to, steel (e.g., stainless steel). The present disclosure, however, is not limited to the foregoing exemplary shaft materials.

The seal assembly 34 is configured to provide a seal interface between the static structure 28 and the impeller rotor 30. The seal assembly 34 of FIG. 1, for example, includes an impeller rotor seal runner 118 (e.g., a rotating seal land, a sleeve, etc.) and a stationary seal element 120.

Figure 3:
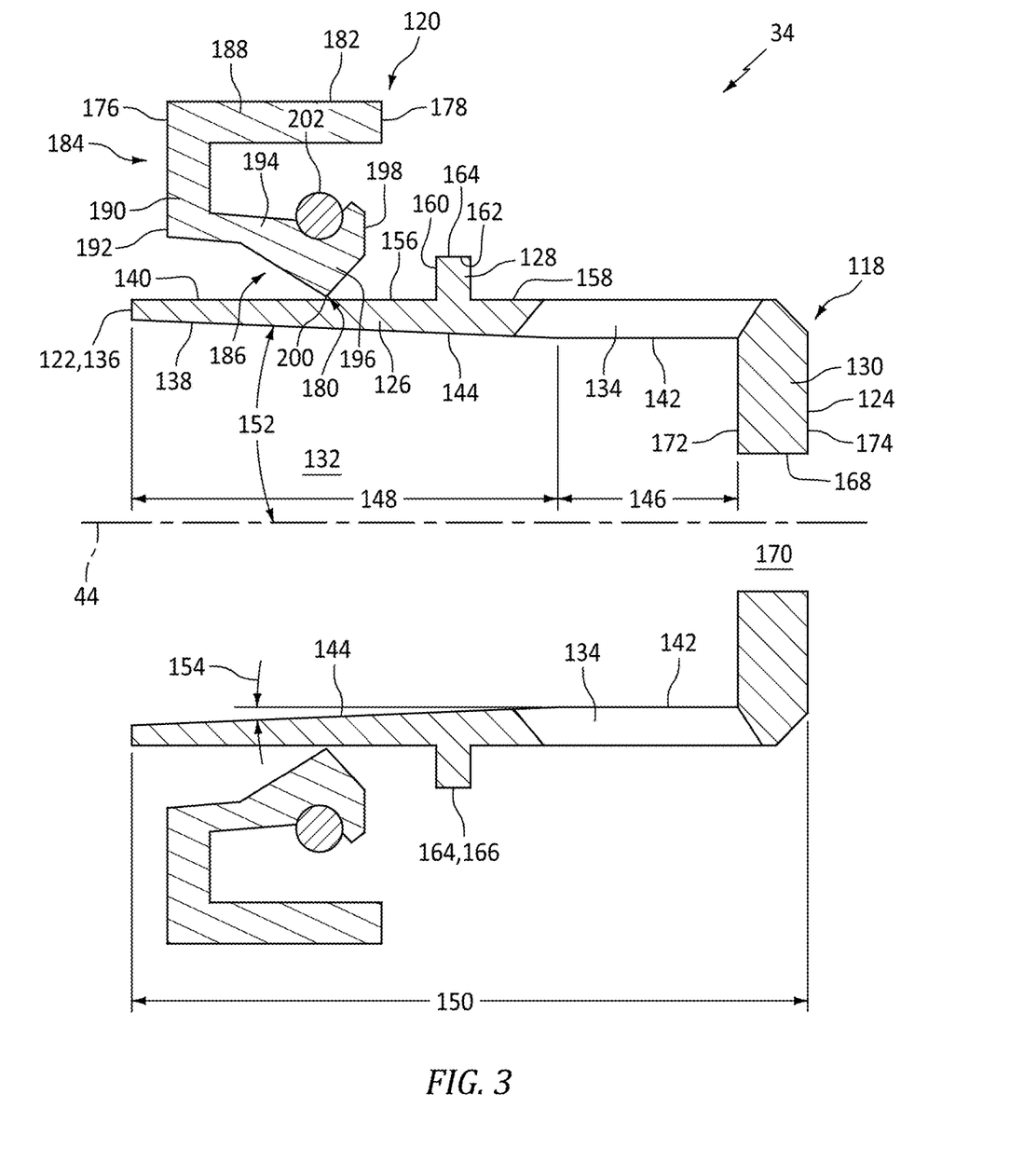
FIG. 3 is a side sectional illustration of a seal land arranged with a seal element.

Referring to FIG. 3, the seal runner 118 extends axially along the rotational axis 44 between and to an axial first side 122 of the seal runner 118 and an axial second side 124 of the seal runner 118. The seal runner 118 of FIG. 3 includes a runner sidewall 126, a runner rim 128 and a runner endwall 130. This seal runner 118 also includes a runner bore 132 and one or more runner ports 134; e.g., apertures such as through-holes. The seal runner 118 and each of its members 126, 128 and 130 extends circumferentially about (e.g., completely around) the rotational axis 44. The seal runner 118 and each of its members 126, 128 and 130 may thereby have a full-hoop geometry.

The runner sidewall 126 is disposed at the runner first side 122. The runner sidewall 126 of FIG. 3, for example, projects axially along the rotational axis 44 out from the runner endwall 130 to an axial distal end 136 of the seal runner 118 and its runner sidewall 126 at the runner first side 122. The runner sidewall 126 extends radially from a radial inner side 138 of the runner sidewall 126 to a radial outer side 140 of the runner sidewall 126.

At the sidewall inner side 138, the runner sidewall 126 includes an inner base surface 142 and an inner guide surface 144 axially adjacent the inner base surface 142. Each of these sidewall surfaces 142, 144 extends axially along and circumscribes the runner bore 132. Each of the sidewall surfaces 142, 144 thereby forms a respective radial outer peripheral boundary of the runner bore 132.

The inner base surface 142 is disposed axially between the runner endwall 130 and the inner guide surface 144. The inner base surface 142 of FIG. 3, for example, projects axially along the rotational axis 44 from the runner endwall 130 to the inner guide surface 144. The inner base surface 142 has an axial length 146, where the base surface length 146 of FIG. 3 is measured between the runner endwall 130 and the inner guide surface 144. The inner base surface 142 may be a (e.g., regular) cylindrical surface. The inner base surface 142 may thereby be parallel to the rotational axis 44 when viewed, for example, in a first reference plane parallel with (e.g., including) the rotational axis 44; e.g., the plane of FIG. 3.

The inner guide surface 144 is disposed axially between the inner base surface 142 and the runner first side 122/the runner distal end 136. The inner guide surface 144 of FIG. 3, for example, projects axially along the rotational axis 44 from the inner base surface 142 towards (e.g., to) the runner first side 122/the runner distal end 136. The inner guide surface 144 has an axial length 148, where the guide surface length 148 of FIG. 3 is measured between the inner base surface 142 and the runner first side 122/the runner distal end 136. This guide surface length 148 may be sized equal to or larger than the base surface length 146. The guide surface length 148 may also or alternatively be sized equal to or larger than one-third (⅓), one-half (½) or two-thirds (⅔) of an axial length 150 of the seal runner 118, where the runner length of FIG. 3 is measured between the runner first side 122 and the runner second side 124. The present disclosure, however, is not limited to such exemplary dimensional relationships.

The inner guide surface 144 is configured as a radially divergent surface. The inner guide surface 144 of FIG. 3, for example, (e.g., continuously) radially diverges away from the rotational axis 44 as the inner guide surface 144 extends axially along the rotational axis 44 (a) from the inner base surface 142/away from the runner endwall 130 and (b) towards (e.g., to) the runner first side 122/the runner distal end 136. The inner guide surface 144 may thereby be a (e.g., regular) frustoconical surface. The inner guide surface 144 of FIG. 3 is angularly offset from the rotational axis 44 by a non-zero acute angle 152 when viewed, for example, in the first reference plane. This offset angle 152 may be equal to or less than thirty degrees (30°); e.g., less than or equal to fifteen degrees (15°) or ten degrees (10°). With this arrangement, a slope of the inner guide surface 144 has a radial rise and an axial run where the axial run is greater than the radial rise. The inner guide surface 144 of FIG. 3 is also angularly offset from the inner base surface 142 by a non-zero offset angle 154 when viewed, for example, in the first reference plane. This offset angle 154 may be equal to or less than thirty degrees (30°); e.g., less than or equal to fifteen degrees (15°) or ten degrees (10°). The present disclosure, however, is not limited to such exemplary positional relationships.

While the seal runner 118 and its runner sidewall 126 are shown in FIG. 3 with both the inner guide surface 144 and the inner base surface 142, the present disclosure is not limited to such an exemplary arrangement. It is contemplated, for example, the inner guide surface 144 may alternatively be extended axially to the runner endwall 130.

At the sidewall outer side 140, the runner sidewall 126 includes an outer land surface 156 and an outer mount surface 158. These sidewall surfaces 156 and 158 are disposed to opposing axial sides 160 and 162 of the runner rim 128. The outer land surface 156 of FIG. 3, for example, is disposed axially between the runner rim 128 and the runner first side 122/the runner distal end 136. The outer land surface 156 may thereby extend axially along (e.g., axially overlap) and extend circumferentially about (e.g., circumscribe) a downstream portion of the inner guide surface 144. The outer mount surface 158 of FIG. 3, by contrast, is disposed axially between the runner rim 128 and the runner second side 124. The outer mount surface 158 may thereby extend axially along (e.g., axially overlap) and extend circumferentially about (e.g., circumscribe) an upstream portion of the inner guide surface 144 and/or a downstream portion of the inner base surface 142.

The outer land surface 156 may be a (e.g., regular) cylindrical surface. The outer land surface 156 may thereby be parallel to the rotational axis 44 when viewed, for example, in the first reference plane. Similarly, the outer mount surface 158 may be a (e.g., regular) cylindrical surface. The outer mount surface 158 may thereby be parallel to the rotational axis 44 when viewed, for example, in the first reference plane. The outer mount surface 158 may (or may not) also be radially aligned with the outer land surface 156.

Figure 4A:
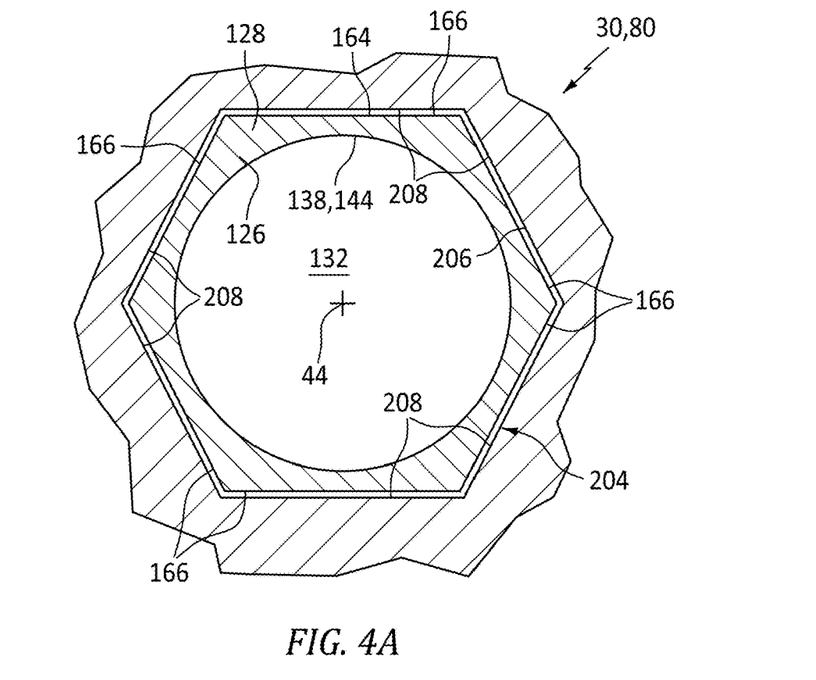
FIGS. 4A and 4B are partial cross-sectional illustrations at an interface between the impeller rotor and a seal runner with various seal runner rim arrangements.
Figure 4B:
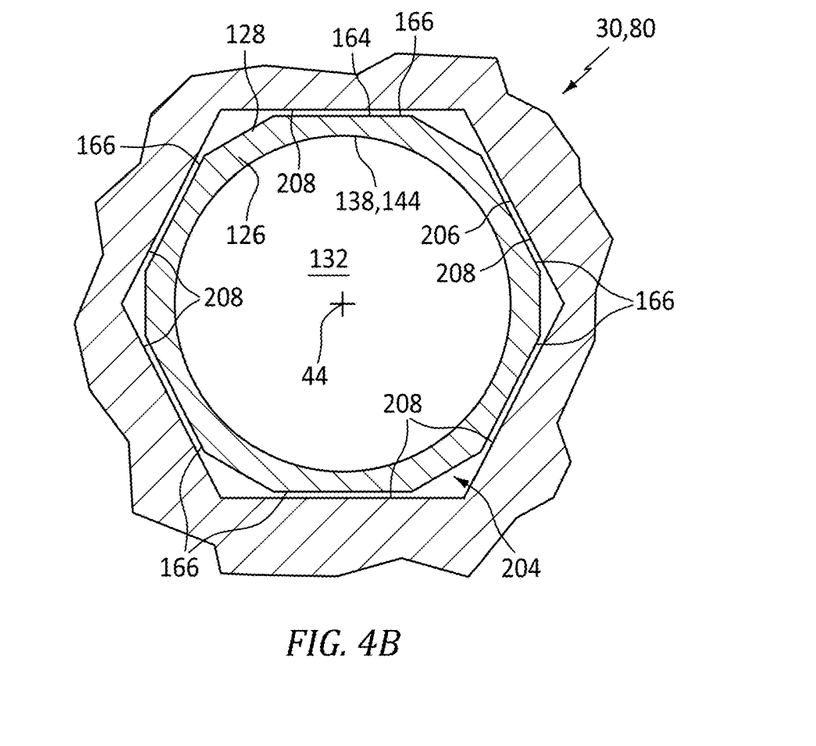

The runner rim 128 is connected to (e.g., formed integral with or otherwise attached to) the runner sidewall 126 at its sidewall outer side 140. The runner rim 128 projects radially out from the sidewall outer side 140 to a radial distal outer end 164 of the runner rim 128. The runner rim 128 extends axially along the runner sidewall 126 between the opposing axial sides 160 and 162 of the runner rim 128, where the rim first side 160 is axially next to the outer land surface 156, and where the rim second side 162 is axially next to the outer mount surface 158. Referring to FIGS. 4A and 4B, the runner rim 128 is configured with a regular or irregular polygonal cross-sectional geometry at its rim outer end 164 when viewed, for example, in a second reference plane perpendicular to the rotational axis 44; e.g., the planes of FIGS. 4A and 4B. Examples of this rim geometry include, but are not limited to, a hexagonal geometry (e.g., see FIG. 4A) and a dodecagonal geometry (e.g., see FIG. 4B). With such a configuration, the runner rim 128 is provided with one or more flats 166 (e.g., flat planar surfaces) arranged circumferentially about the rotational axis 44 at the rim outer end 164 in an array; e.g., a circular array. These flats 166 are configured as anti-rotation features as described below in further detail.

Referring to FIG. 3, the runner endwall 130 is connected to (e.g., formed integral with or otherwise attached to) the runner sidewall 126. This runner endwall 130 is disposed at the runner second side 124. The runner endwall 130 projects radially inward away from the runner sidewall 126 and its sidewall inner side 138 to a radial distal inner end 168 of the runner endwall 130. This endwall inner end 168 forms a mounting aperture 170 which projects axially through the runner endwall 130 to the runner bore 132. The runner endwall 130 extends axially between opposing axial sides 172 and 174 of the runner endwall 130, where the endwall second side 174 is formed by the runner second side 124.

The runner bore 132 projects axially along the rotational axis 44 into the seal runner 118 from the runner first side 122 to the runner endwall 130 and its endwall first side 172. The runner bore 132 projects radially out from the rotational axis 44 to the runner inner end 168 and its inner guide surface 144 and its inner base surface 142.

The runner ports 134 are arranged and may be equispaced circumferentially about the rotational axis 44 in an array; e.g., a circular array. This array of the runner ports 134 axially overlaps and circumscribes the runner bore 132. Each of the runner ports 134 extends radially through the seal runner 118 and its runner sidewall 126 from the sidewall outer side 140 to the sidewall inner side 138. Each of the runner ports 134 of FIG. 3 pierces the inner base surface 142. Each of the runner ports 134 may also pierce the inner guide surface 144. With the foregoing arrangement, each of the runner ports 134 of FIG. 3 is fluidly coupled with the runner bore 132.

The seal runner 118 of FIG. 3 and its components 126, 128 and 130 are configured together as a monolithic body, which may be discrete from the impeller rotor 30 and/or the shaft 32 (see FIG. 1). The seal runner 118, for example, may be cast, machined, additive manufactured and/or otherwise formed as a single, unitary body. The seal runner 118 is constructed from or otherwise includes seal land material. This seal land material may be different than the impeller rotor material. The seal land material, for example, may be a relatively dense, hard and/or abrasion resistant material such as, but not limited to, steel (e.g., stainless steel). The present disclosure, however, is not limited to the foregoing exemplary seal land materials, nor to monolithic seal land configurations.

The seal element 120 of FIG. 3 extends axially along the rotational axis 44 between and to an axial first side 176 of the seal element 120 and an axial second side 178 of the seal element 120. The seal element 120 extends (e.g., completely) circumferentially around the rotational axis 44 providing the seal element 120 with a full-hoop (e.g., annular) body. The seal element 120 extends radially between a radial inner side 180 of the seal element 120 and a radial outer side 182 of the seal element 120.

The seal element 120 may be configured as a (e.g., annular) lip seal. The seal element 120 of FIG. 3, for example, includes a (e.g., annular) seal base 184 and a (e.g., tubular) seal leg 186; e.g., a flange. The seal base 184 of FIG. 3 includes an outer leg 188 and an inner leg 190. The outer leg 188 is disposed at the element outer side 182. The outer leg 188 extends axially along the rotational axis 44 between and to (or about) the element first side 176 and the element second side 178. The inner leg 190 is disposed at the element first side 176, and is connected to (e.g., formed integral with or otherwise attached to) the outer leg 188. The inner leg 190 projects radially inwards from outer leg 188 to a first end 192 of the seal leg 186. With this arrangement, the seal base 184 may have an L-shaped sectional geometry when viewed, for example, in the first reference plane; e.g., the plane of FIG. 3.

The seal leg 186 of FIG. 3 includes a (e.g., tubular) leg base 194 and a (e.g., annular) leg rim 196; e.g., a knife edge seal protrusion. The leg base 194 is disposed at the element inner side 180, and is connected to (e.g., formed integral with or otherwise attached to) and cantilevered from the inner leg 190. The leg base 194 extends axially along the rotational axis 44 between and to (or about) the element first side 176 and the element second side 178. More particularly, the leg base 194 of FIG. 3 projects axially out from the inner leg 190 and the seal leg first end 192 to a second end 198 of the seal leg 186 at the element second side 178. The leg rim 196 is disposed at (or about) the seal leg second end 198, and is connected to (e.g., formed integral with) the leg base 194. The leg rim 196 projects radially inward from the leg base 194 to a distal end tip 200; e.g., a pointed, annular edge.

The seal element 120 may also include a biasing element 202 such as, but not limited to, a garter spring. The biasing element 202 of FIG. 3 extends circumferentially about and radially engages (e.g., contacts) the seal leg 186. The biasing element 202 of FIG. 3, for example, is seated in a (e.g., annular) backside groove in the seal leg 186 proximate the element second side 178. This biasing element 202 is configured to bias (e.g., push) the seal leg 186 and, thus, the leg rim 196 radially inwards towards the rotational axis 44.

Referring to FIG. 1, the seal runner 118 is mated with the impeller rotor 30. The runner second side 124, for example, is inserted into the structure bore 98 (see FIG. 2). The runner sidewall 126 and its outer mount surface 158 may radially engage (e.g., abut against, contact, etc.) or otherwise be in close proximity to the vane array structure 80. The runner endwall 130 may axially engage (e.g., abut against, contact, etc.) an annular shoulder of the impeller rotor 30.

The runner rim 128 may be plugged axially into and seated in a recess 204 in the impeller rotor 30, where the rim second side 162 may be axially spaced from an axial shelf of the recess 204. Referring to FIGS. 4A and 4B, a radial outer side 206 of the recess 204 may be shaped to match or otherwise be compatible with the polygonal geometry of the rim outer end 164. The recess outer side 206 of FIGS. 4A and 4B, for example, has a regular or irregular polygonal cross-sectional geometry when viewed, for example, in the second reference plane. Examples of this recess geometry include, but are not limited to, a hexagonal geometry (e.g., see FIGS. 4A and 4B) and a dodecagonal geometry. With such a configuration, the recess outer side 206 is provided with one or more flats 208 (e.g., flat planar surfaces) arranged circumferentially about the rotational axis 44 in an array; e.g., a circular array. Each of these recess flats 208 is configured to be next to and engage a respective one of the rim flats 166. The combination of the rim flats 166 and the recess flats 208 may thereby rotationally fix a position of the seal runner 118 relative to the impeller rotor 30. In addition, the rim flats 166 and the recess flats 208 may be arranged to provide a certain positional clocking of the seal runner 118 relative to the impeller rotor 30.

Referring to FIG. 1, an end portion of the shaft 32 may project axially through the hub bore 88 (see FIG. 2) and the mounting aperture 170 (see FIG. 3), and into the runner bore 132. A coupler 210 (e.g., a nut) may be mated with the shaft end portion such that (A) the runner endwall 130 is captured and may be clamped axially between the coupler 210 and the rotor hub 76, and (B) the rotor hub 76 is captured and may be clamped axially between the runner endwall 130 and an annular shoulder of the shaft 32 (not visible in FIG. 1). The shaft 32 may thereby (e.g., axially) secure (e.g., mechanically fasten) the impeller rotor 30 and the seal runner 118 together. These assembled components 30, 32 and 118 form a rotating assembly for the powerplant deaerator 20, where the seal runner 118 is generally located to the first side 68 of the impeller rotor 30 and the shaft 32 is generally located to the second side 70 of the impeller rotor 30 (see FIG. 2). A (e.g., rectangular) key 212 may be provided between the impeller rotor 30 and the shaft 32 to rotationally fix the impeller rotor 30 to the shaft 32.

The impeller rotor 30 (e.g., the rotor shroud 78 and/or the vane array structure 80) and the seal runner 118 are arranged in the rotor cavity 36. The impeller rotor 30 (e.g., the rotor hub 76) and the shaft 32 are seated within a bore of the static structure 28. The shaft 32 may be rotatably supported within the static structure 28 by at least one bearing; e.g., a journal bearing. The inlet passages 108 are fluidly coupled with the fluid inlet passage 38. The liquid outlet passages 112 are fluidly coupled with the liquid outlet passage 40 through the outlet 116. The gas outlet passages 110 are fluidly coupled with the gas outlet passage 42 through the runner ports 134 and the runner bore 132.

To reduce or prevent fluid leakage between the liquid outlet passage 112 and the gas outlet passage 110, the seal element 120 is arranged within the rotor cavity 36 adjacent the scal runner 118. The seal base 184, for example, is attached to the static structure 28. The seal base 184 of FIG. 1, for example, may be press-fit into a notch in the static structure 28. Referring to FIG. 3, the seal leg 186 axially overlaps and radially engages the outer land surface 156. The biasing element 202 biases the seal leg 186 against the seal runner 118 and its outer land surface 156. The tip 200 may thereby sealingly engage (e.g., radially contact) the outer land surface 156. Since the seal runner 118 may be constructed from the relatively dense, durable and/or abrasion resistant seal land material as described above, the outer land surface 156 may be susceptible to less wear than if the seal runner 118 was made from a lightweight material such as the impeller rotor material. In addition or alternatively, the seal runner 118 may be provided with a hard coating and/or a nitride coating to form the outer land surface 156.

During powerplant deaerator operation, the fluid flow 22 with the liquid component and the gas component flows into the inlet passages 108 from the fluid inlet passage 38. Rotation of the impeller rotor 30 propels the relatively heavy liquid component of the fluid flow 22 towards and/or against the rotor shroud 78, and this liquid component of the fluid flow 22 flows along the rotor shroud 78 out of the liquid outlet passages 112 and into the liquid outlet passage 40. The relatively light gas component of the fluid flow 22, by contrast, may more readily flow through the gas outlet passages 110, the runner ports 134 and the runner bore 132 and into the gas outlet passage 42. The rotation of the impeller rotor 30 may thereby substantially separate the incoming fluid flow 22 into the separate liquid component flow 24 and the separate gas component flow 26. However, under certain circumstances, some of the liquid component still entrained in and/or carried by the gas may flow into the runner bore 132. To prevent a backflow of this liquid, the seal runner 118 is provided with its inner guide surface 144. The divergent configuration of the inner guide surface 144 is provided to propel the liquid away from the runner ports 134 and reduce the chances of backflow.

While the runner rim 128 is described above as extending circumferentially around (e.g., circumscribing) the runner sidewall 126, the present disclosure is not limited to such an exemplary full-hoop arrangement. The runner rim 128, for example, may be replaced by one or more other types of anti-rotation protrusions so long as, for example, interface(s) between those protrusion(s) and the impeller rotor 30 rotationally fix the seal runner 118 with the impeller rotor 30. With such arrangements, each protrusion may be configured to mate with (e.g., plug into, be seated within) a uniquely associated recess in the impeller rotor 30, or multiple of the protrusions may mate with (e.g., plug into, be seated within) a common recess in the impeller rotor 30.

The impeller rotor 30 is described above as being included in the powerplant deacrator 20. The present disclosure, however, is not limited to such an exemplary arrangement. In other examples, for example, the impeller rotor 30 may alternatively be configured as a pump impeller rotor for a fluid pump; e.g., a lubricant pump, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft powerplant, comprising:
an impeller rotor configured to rotate about an axis, the impeller rotor including a plurality of fluid circuits arranged circumferentially about the axis within the impeller rotor, and each of the plurality of fluid circuits including a first outlet passage, a second outlet passage and an inlet passage fluidly coupled to the first outlet passage and the second outlet passage in parallel; and
a seal runner connected to and rotatable with the impeller rotor, the seal runner including a bore, an inner guide surface and an outer land surface, the seal runner extending circumferentially about the axis and radially between the inner guide surface and the outer land surface, the bore fluidly coupled to the first outlet passage of each of the plurality of fluid circuits, the inner guide surface forming a radial outer peripheral boundary of the bore, and the inner guide surface radially diverging away from the axis as the inner guide surface extends axially away from the impeller rotor and to a distal end of the seal runner;

wherein the seal runner comprises:
  an endwall;
  a sidewall projecting axially out from the endwall to the distal end of the seal runner; and
  a rim projecting radially out from the sidewall to an outer end of the rim,
wherein the rim is seated in a recess in the impeller rotor; and
wherein the rim comprises a flat disposed at the outer end of the rim and configured to engage a flat of the impeller rotor.

2. The apparatus of claim 1, wherein the inner guide surface is a frustoconical surface.

3. The apparatus of claim 1, wherein a slope of the inner guide surface has a radial rise and an axial run where the axial run is greater than the radial rise.

4. The apparatus of claim 1, wherein the inner guide surface is angularly offset from the axis by an angle less than fifteen degrees.

5. The apparatus of claim 1, wherein an axial length of the inner guide surface is equal to or greater than one-third of an axial length of the seal runner.

6. The apparatus of claim 1, wherein
the sidewall includes the inner guide surface, the outer land surface and a plurality of ports, each of the plurality of ports extends radially through the sidewall, and each of the plurality of ports fluidly couples the first outlet passage of at least one of the plurality of fluid circuits to the bore; and
the bore extends axially along the sidewall to the endwall.

7. The apparatus of claim 6, wherein
the sidewall further includes an inner base surface angularly offset from the inner guide surface; and
each of the plurality of ports pierces the inner base surface.

8. The apparatus of claim 7, wherein the inner base surface is a cylindrical surface.

9. The apparatus of claim 1, wherein the outer end of the rim has a polygonal cross-sectional geometry in a reference plane perpendicular to the axis.

10. The apparatus of claim 1, wherein the recess has a polygonal cross-sectional geometry in a reference plane perpendicular to the axis.

11. The apparatus of claim 1, wherein the seal runner is mechanically attached to the impeller rotor.

12. The apparatus of claim 1, further comprising a lip seal circumscribing and radially sealingly engaging the outer land surface.

13. The apparatus of claim 1, wherein
the impeller rotor includes a vane structure and a shroud circumscribing the vane structure;
the vane structure includes a first sidewall, a second sidewall and a plurality of vanes arranged circumferentially about the axis; and
each of the plurality of vanes comprises
an inlet vane portion radially between the second sidewall and the shroud, the inlet vane portion forming a side of the inlet passage of a respective one of the plurality of fluid circuits;
a first outlet vane portion axially between the first sidewall and the second sidewall, the first outlet vane portion forming a side of the first outlet passage of a respective one of the plurality of fluid circuits; and
a second outlet vane portion radially between the first sidewall and the shroud, the second outlet vane portion forming a side of the second outlet passage of a respective one of the plurality of fluid circuits.

14. The apparatus of claim 1, wherein the impeller rotor comprises a deaerator impeller rotor.

15. An apparatus for an aircraft powerplant, comprising:
an impeller rotor configured to rotate about an axis, the impeller rotor including a plurality of fluid circuits arranged circumferentially about the axis within the impeller rotor, and each of the plurality of fluid circuits including a first outlet passage, a second outlet passage and an inlet passage fluidly coupled to the first outlet passage and the second outlet passage in parallel; and
a seal runner projecting axially out from the impeller rotor to a distal end of the seal runner, the seal runner including a bore, a plurality of ports, an inner guide surface and an outer land surface, the seal runner extending circumferentially about the axis and radially between the inner guide surface and the outer land surface, each of the plurality of ports fluidly coupling the first outlet passage of at least one of the plurality of fluid circuits to the bore, the inner guide surface forming a radial outer peripheral boundary of the bore, the inner guide surface radially diverging away from the axis as the inner guide surface extends axially away from the impeller rotor, and the inner guide surface angularly offset from the axis by an angle less than fifteen degrees;
the seal runner comprising an endwall, a sidewall and a rim, the sidewall projecting axially out from the endwall to the distal end of the seal runner, and the rim projecting radially out from the sidewall to an outer end of the rim, wherein a flat of the rim at the outer end of the rim engages a flat of the impeller rotor.

16. The apparatus of claim 15, wherein the inner guide surface extends axially to the distal end of the seal runner.

17. The apparatus of claim 15, wherein
the seal runner further includes an inner base surface parallel with the axis, and the inner base surface further forms another radial outer peripheral boundary of the bore; and
each of the plurality of ports pierces the inner base surface.

18. The apparatus of claim 15, wherein
the seal runner further includes an inner base surface axially adjacent the inner guide surface, and the inner base surface further forms another radial outer peripheral boundary of the bore;
each of the plurality of ports pierces the inner base surface; and
an axial length of the inner guide surface is equal to or greater than an axial length of the inner base surface.

19. An apparatus for an aircraft powerplant, comprising:
an impeller rotor configured to rotate about an axis, the impeller rotor including a plurality of fluid circuits arranged circumferentially about the axis within the impeller rotor, and each of the plurality of fluid circuits including a first outlet passage, a second outlet passage and an inlet passage fluidly coupled to the first outlet passage and the second outlet passage in parallel;
a seal runner projecting axially out from the impeller rotor to a distal end of the seal runner, the seal runner including a bore, a plurality of ports, an inner guide surface and an outer land surface, the seal runner extending circumferentially about the axis and radially between the inner guide surface and the outer land surface, each of the plurality of ports fluidly coupling the first outlet passage of at least one of the plurality of fluid circuits to the bore, the inner guide surface forming a radial outer peripheral boundary of the bore, the inner guide surface radially diverging away from the axis as the inner guide surface extends axially away from the impeller rotor; and a lip seal circumscribing and radially sealingly engaging the outer land surface, the lip seal axially overlapping the inner guide surface;

wherein the seal runner comprises:
- an endwall;
- a sidewall projecting axially out from the endwall to the distal end of the seal runner; and
- a rim projecting radially out from the sidewall to an outer end of the rim, wherein the rim is seated in a recess in the impeller rotor; and wherein the rim comprises a flat disposed at the outer end of the rim, and the flat of the rim contacts a flat of the impeller rotor.

* * * * *